(12) United States Patent
Eerenberg et al.

(10) Patent No.: US 9,699,477 B2
(45) Date of Patent: *Jul. 4, 2017

(54) MANIPULATING SUB-PICTURES OF A COMPRESSED VIDEO SIGNAL

(71) Applicant: Entropic Communications, LLC, Carlsbad, CA (US)

(72) Inventors: Onno Eerenberg, Eindhoven (NL); Eric Gijsbers, Eindhoven (NL); Ewout Brandsma, Eindhoven (NL)

(73) Assignee: Entropic Communications, LLC, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/218,420

(22) Filed: Jul. 25, 2016

(65) Prior Publication Data

US 2016/0337664 A1 Nov. 17, 2016

Related U.S. Application Data

(63) Continuation of application No. 10/531,902, filed as application No. PCT/IB03/04215 on Sep. 19, 2003, now Pat. No. 9,462,295.

(51) Int. Cl.
*H04N 7/12* (2006.01)
*H04N 19/59* (2014.01)
(Continued)

(52) U.S. Cl.
CPC .......... *H04N 19/59* (2014.11); *H04N 19/174* (2014.11); *H04N 19/23* (2014.11); *H04N 19/30* (2014.11); *H04N 19/61* (2014.11); *H04N 19/87* (2014.11)

(58) Field of Classification Search
None
See application file for complete search history.

(56) References Cited

U.S. PATENT DOCUMENTS 5,633,683 A  5/1997  Rosengren et al.
5,649,032 A  7/1997  Burt
(Continued)

FOREIGN PATENT DOCUMENTS

EP  0987897  3/2000
EP  1035733  9/2000
(Continued)

OTHER PUBLICATIONS

Patent Cooperation Treaty, Notification of Transmittal of the International Search Report and the Written Opinion of the International Searching Authority, in PCT/IB0304215, dated Dec. 3, 2003.

*Primary Examiner* — James M Anderson, II
(74) *Attorney, Agent, or Firm* — McAndrews, Held & Malloy, Ltd.

(57) ABSTRACT

The invention relates to manipulation of sub-pictures (303) in a picture such as a mosaic screen (301). An apparatus comprises a sub-picture generator (105) connected to a mosaic screen generator (107), which generates the mosaic screen (301) from the sub-pictures. The mosaic screen (301) is by a video compressor (111) divided into uncompressed picture blocks such that each block only comprise video data from one sub-picture. The picture blocks are compressed using a block compression scheme such as MPEG-2. The apparatus further comprises a video manipulation processor (113), which manipulates the sub-pictures by manipulating the association between control data in the video signal and the compressed picture blocks. The video data of the compressed picture blocks are not affected whereby de-compression and new compression is avoided.

20 Claims, 4 Drawing Sheets

(51) Int. Cl.
*H04N 19/30* (2014.01)
*H04N 19/61* (2014.01)
*H04N 19/174* (2014.01)
*H04N 19/23* (2014.01)
*H04N 19/87* (2014.01)

(56) References Cited

U.S. PATENT DOCUMENTS

| | | |
|---|---|---|
| 5,694,173 A | 12/1997 | Kimura et al. |
| 5,822,014 A | 10/1998 | Steyer et al. |
| 6,058,212 A | 5/2000 | Yokoyama |
| 6,075,567 A | 6/2000 | Ohnishi |
| 6,141,053 A | 10/2000 | Saukkonen |
| 6,141,059 A | 10/2000 | Boyce et al. |
| 6,236,395 B1 | 5/2001 | Sezan et al. |
| 6,324,216 B1 | 11/2001 | Igarashi et al. |
| 6,377,713 B1 | 4/2002 | Vuong |
| 6,931,660 B1 | 8/2005 | Kalluri et al. |

FOREIGN PATENT DOCUMENTS

| | | |
|---|---|---|
| JP | 2000299868 | 10/2000 |
| JP | 2010210465 | 9/2010 |
| WO | 0018120 | 3/2000 |

MANIPULATING SUB-PICTURES OF A COMPRESSED VIDEO SIGNAL

RELATED APPLICATIONS

This application is a continuation of application Ser. No. 10/531,902, filed Apr. 18, 2005, which is a 371 application claiming the benefit of PCT/IB03/04215, filed Sep. 19, 2003. Each of the above identified applications is hereby incorporated by reference in its entirety.

FIELD OF THE INVENTION

The invention relates to manipulation of sub-pictures in a compressed video signal.

BACKGROUND OF THE INVENTION

In order to reduce the bandwidth required to transmit digital video signals, it is well known to use video compression whereby the data rate of a video signal is substantially reduced.

One of the most widely used video compression techniques is known as the MPEG-2 (Motion Picture Expert Group). MPEG-2 is a block based compression scheme, wherein a frame is divided into a plurality of blocks each comprising eight vertical and eight horizontal pixels. For compression of luminance data, each block is individually compressed using a Discrete Cosine Transform (DCT) followed by quantization, which reduces a significant number of the transformed data values to zero. For compression of chrominance data 1, 2 or even 4 blocks per colour difference signal are used per macroblock, depending on the colour sub-sampling mode. Frames based only on intra-frame compression are known as Intra Frames (I-Frames).

In addition to intra-frame compression, MPEG-2 uses inter-frame compression to further reduce the data rate. Inter-frame compression includes generation of predicted frames (P-frames) based on previous I-frames or P-frames. In addition, I and P frames are typically interposed by Bidirectional predicted frames (B-frames), wherein compression is achieved by only transmitting the differences between the B-frame and surrounding I- and P-frames (or surrounding P frames). In addition, MPEG-2 uses motion estimation wherein the image of blocks of one frame found in subsequent frames at different positions are communicated simply by use of a motion vector.

As a result of these compression techniques, video signals of standard TV studio broadcast quality level can be transmitted at data rates around 2-4 Mbps.

A frequently performed operation by a user of video equipment is navigation through a video sequence to locate specific occurrence. Current analogue Video Cassette Recorders have fast search modes and slow motion to support the user in finding a specific occurrence. In digital storage devices, navigation becomes possible based on mosaic screens, wherein a picture contains a number of sub-pictures that have a temporal distance. In this way, the user can get an overview of a specific part of a video sequence, and by scrolling through the mosaic screen, specific sections of the video sequence can be selected. The mosaic screen may comprise sub-pictures with a constant interval or may relate to specific events such as a scene change. Specifically, sub-pictures and mosaic screens may be used in a hierarchical fashion to build up a Visual Table Of Content (VTOC) which significantly facilitates the navigation through video material.

The VTOC could be generated during recording or playback of the video material. At regular intervals or at specific occurrences, the current video image is sampled and stored. The image is then reduced in size and resolution to fit a sub-picture. The mosaic screen generated from a plurality of these sub-images is uncompressed and therefore is very large and requires a large bandwidth and storage capacity. Consequently, the mosaic screen is compressed using the MPEG-2 compression algorithm.

When a sub-picture of a mosaic screen is reused in a different mosaic screen, the compressed mosaic screen is de-compressed, the appropriate sub-picture(s) is/are selected and combined with new sub-pictures.

It is clear, that manipulation of compressed sub-pictures in compressed video signals is very complex and requires significant amount of processing power. Thus, manipulation becomes very slow and further requires extra power consumption of the processing resources required. Hence, an improved method of manipulation of sub-pictures in a compressed video signal domain would be advantageous.

SUMMARY OF THE INVENTION

Accordingly, the Invention seeks to improve the manipulation of sub-pictures of a compressed video signal. Preferably, the invention alleviates or mitigates one or more of the above disadvantages singly or in combination.

Accordingly there is provided, in a first aspect, a method of manipulating sub-pictures of a compressed video signal, comprising the steps of: generating a video signal comprising a plurality of sub-pictures; dividing at least a first frame of the video signal into a plurality of uncompressed picture blocks such that each uncompressed picture block comprises video data related to only one sub-picture; generating a compressed video signal by using a video block based compression scheme to generate compressed picture blocks from the uncompressed picture blocks; and manipulating at least a first sub-picture of the compressed video signal by manipulating the association of control data with compressed picture blocks related to the first sub-picture without modifying compressed video data of compressed picture blocks.

Thus, the method provides a very simple method for manipulating sub-pictures without requiring the compressed video data of the compressed picture blocks to be modified. Thereby the manipulation operations can be performed using the existing compressed picture blocks, and there is no need for the manipulation to include compression and decompression. This provides for a very low complexity system with high flexibility. The computational resource required for manipulation is substantially reduced, and likewise is the delay caused by any manipulation. Further, as the computational resource is limited, the power consumption can be reduced as well.

According to one feature of the invention, the step of manipulating at least the first sub-picture comprises replacing compressed picture blocks of the first sub-picture with compressed picture blocks of a different picture without changing the control data. This provides for a very simple and low complexity method of manipulating the sub-pictures, especially when the compressed picture blocks in the video signal are ordered with respect to their position in the full picture.

According to a second feature of the invention, the step of manipulating the at least one first sub-picture comprises associating the control data of a second sub-picture with the compressed picture blocks of the first sub-picture. This provides for a very simple and low complexity method of manipulating the sub-pictures, especially when the position of the compressed picture blocks in the full picture is determined from information in the control data.

According to a third feature of the invention, the control data comprises information related to the position of an associated sub-picture. This facilitates the manipulation of a position of the sub-picture in the full picture as this information can be modified to effect a position change.

According to a fourth feature of the invention, the control data comprises identification data, and the method further comprises the step of selecting the compressed data blocks of the first sub-picture by parsing the compressed video signal to detect identification data corresponding to the first sub-picture. Hence, selection can be performed by simple parsing, which is a simple, fast and low resource demanding operation.

According to a fifth feature of the invention, the compressed video signal comprises a plurality of slices each slice comprising a slice header and a number of consecutive compressed picture blocks. Such an arrangement facilitates the manipulation, as it can be performed by manipulation of the slices and specifically vertical scrolling can very easily be achieved.

According to a sixth feature of the invention, each slice comprises a single compressed picture block. This provides for a high degree of flexibility of the manipulation, as this can be performed at a resolution as low as the resolution of a single compressed picture block.

According to seventh feature of the invention, each slice comprises a number of compressed picture blocks corresponding to the width of a sub-picture. This facilitates handling of sub-pictures, as operations on one slice have effect on the picture across the whole width of the sub-picture.

According to an eighth feature of the invention, each slice comprises a number of compressed picture blocks corresponding to a width of a picture. This facilitates handling of sub-pictures, as operations on one slice have effect on the picture across the whole width of the picture.

According to a ninth feature of the invention, the manipulation of the at least first sub-picture comprises manipulating the position of the first sub-picture by performing a shifting operation by replacing the compressed picture blocks of a slice with compressed picture blocks of another slice and modifying the control data. This provides for a low complexity method of performing a shifting operation of a picture having sub-pictures.

According to a tenth feature of the invention, the step of manipulating at least the first sub-picture comprises manipulating a position of the first sub-picture by performing a shifting operation by modifying the control data. This provides for a low complexity method of performing a shifting operation of a picture having sub-pictures.

According to an eleventh feature of the invention, the slice header comprises a slice number and the manipulation of the at least first sub-picture comprises manipulating the vertical position of the first sub-picture by modifying slice numbers for slices comprising compressed picture blocks of the first sub-picture. Hence, manipulation can be performed by a simple operation of changing slice numbers. Specifically, a vertical scrolling operation can be achieved by a simple manipulation of slice numbers.

According to a twelfth feature of the invention, the step of manipulating the at least first sub-picture further comprises replacing the compressed picture blocks with pre-defined compressed picture blocks without modifying the control data whereby pre-determined sub-pictures can be inserted in the compressed video signal. This provides for a simple method for predetermined pictures such as markers or icons to be inserted in the picture.

Preferably, the block compression scheme is an MPEG-2 scheme and the compressed picture blocks are macro blocks.

According to a second aspect of the invention, there is provided an apparatus for manipulating sub-pictures of a compressed video signal, comprising: means for receiving a compressed video signal comprising a plurality of sub-pictures; wherein at least a first frame of the compressed video signal is divided into compressed picture blocks by video block compression of uncompressed picture blocks, the uncompressed picture blocks comprising video data related to only one sub-picture; and means for manipulating at least a first sub-picture of the compressed video signal by manipulating the association of control data with compressed picture blocks related to the first sub-picture without modifying compressed video data of compressed picture blocks.

These and other aspects of the invention will be apparent from and elucidated with reference to the embodiments described hereinafter.

BRIEF DESCRIPTION OF THE DRAWINGS

An embodiment of the invention will be described, by way of example only, with reference to the drawings, in which.

DESCRIPTION OF PREFERRED EMBODIMENTS

An embodiment of the invention will in the following be described with specific reference to MPEG-2 compression, but it will be apparent that the invention is not limited to this application and may be equally applicable to many other video block based compression schemes.

Figure 1:
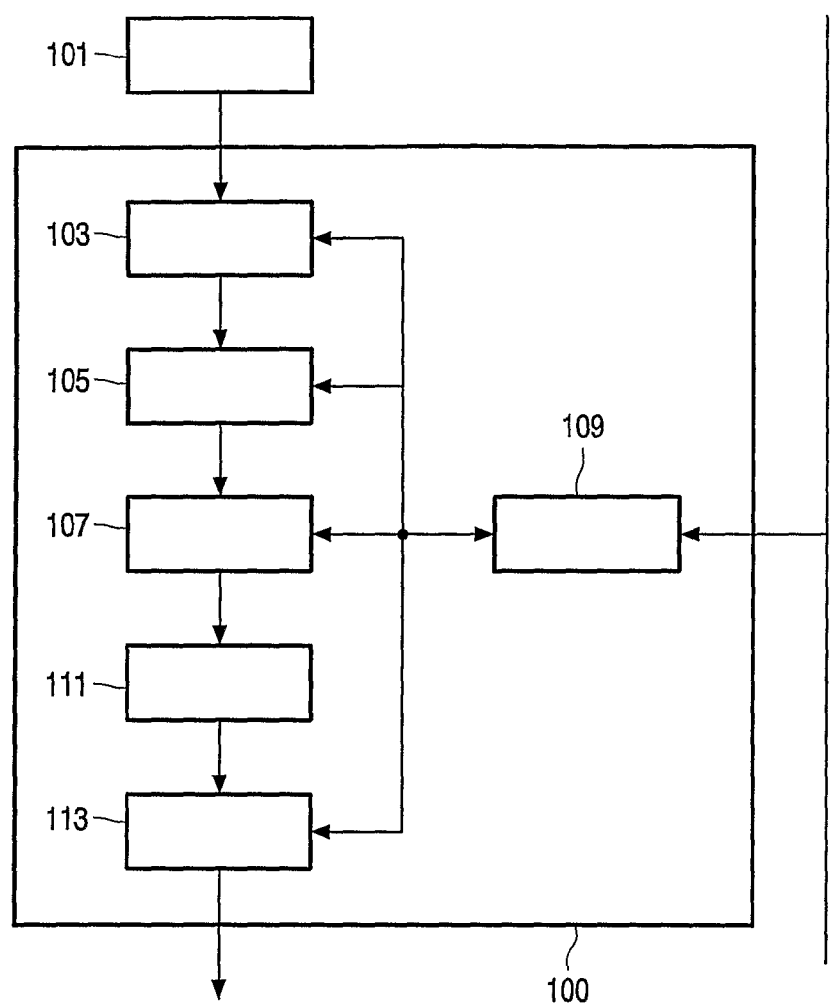
FIG. 1 is an illustration of an apparatus for manipulating sub-pictures of a compressed video signal in accordance with an embodiment of the invention.
Figure 2:
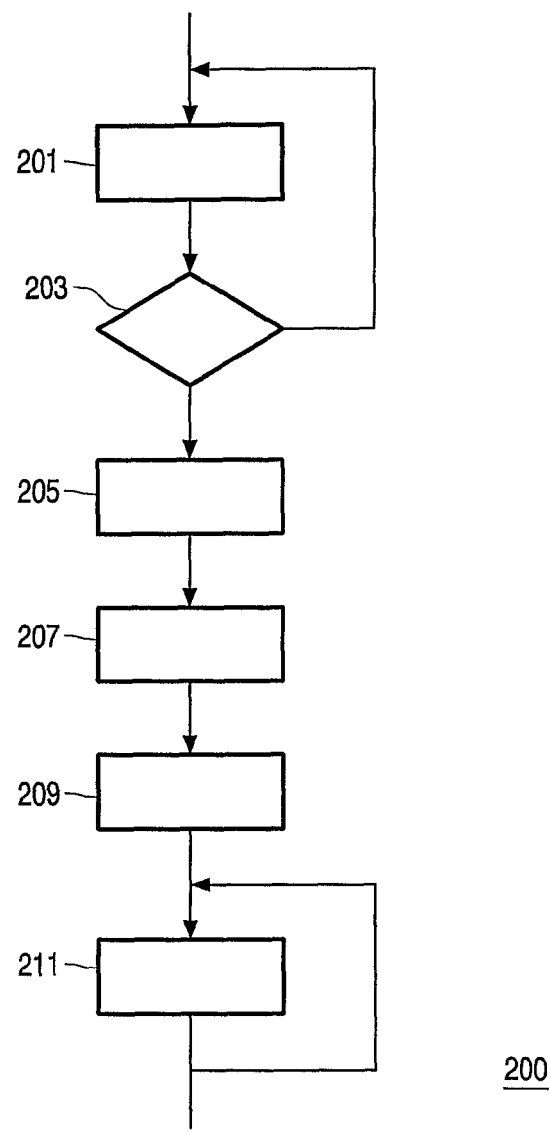
FIG. 2 illustrates a flow-chart of the operation of the apparatus of FIG. 1 in accordance with an embodiment of the invention.

FIG. 1 is an illustration of an apparatus 100 for manipulating sub-pictures of a compressed video signal in accordance with an embodiment of the invention. FIG. 2 illustrates a flow-chart of the operation 200 of the apparatus 100 of FIG. 1 in accordance with an embodiment of the invention.

FIG. 1 shows a video source 101 connected to a picture sampler 103 comprised in the apparatus 100. The video source may be an external camera, video storage unit or a receiver for a broadcast video signal, or any other suitable video source. As such, the video source 101 may be external or internal to the apparatus 100. The video signal from the video source 101 is digital, and is in the preferred embodiment a digital video signal compressed using an MPEG-2 compression scheme. The picture sampler 103 is connected to a sub-picture generator 105, which is further connected to a mosaic screen generator 107. The apparatus 100 further comprises a mosaic screen controller 109, which is connected to most of the other functional blocks of the apparatus 100. The mosaic screen controller 109 is operable to control the various functional blocks of the apparatus 100 to perform the required operations for the generation and manipulation of the mosaic screens. The mosaic screen controller 109 receives user input and controls the operation of the apparatus accordingly.

In step 201 of the flow chart of FIG. 2, a sub-picture is generated. The sub-picture is generated from the video signal from the video source 101. When the mosaic screen controller 109 determines that a sub-picture should be generated, it transmits a control signal to the picture sampler 103, which in return samples the picture currently being received from the video source. In the preferred embodiment, wherein the video signal is an MPEG-2 compressed video signal, the sampling comprises storing all information relevant to decode the current image from the video signal. As such, this information may simply comprise all information from an I-frame, but in other situations it may include the anchor pictures in order to properly decode a selected predictive picture. The sampled data values are passed to the sub-picture generator. In the preferred embodiment, the picture sampler 103 stores the data in a memory that can also be accessed by the sub-picture generator 105. When the picture sampler has extracted and stored all necessary information, it transmits a control signal to the mosaic screen controller 109, which in return starts the sub-picture generator 105.

The sub-picture generator 105 generates a sub-picture by decompressing the frame using the information captured by the picture sampler 103, and in the preferred embodiment, by using MPEG-2 compression techniques as are well known in the art. Once the decompressed image is generated, it is resized and the resolution is changed accordingly. Preferably, this is achieved by resampling and decimating the original image either in the frequency domain or in the time domain. In the preferred embodiment, wherein a mosaic screen is made up of 16 sub-pictures with demarcation border between sub-pictures, the resampling is such that both the horizontal and vertical pixel resolution is reduced by a factor of four. Specifically a 384 by 320 pixel image is resampled as a 96 by 80 pixel picture.

In step 203, the mosaic screen controller 109 determines if more sub-pictures must be generated, and if so the method returns to step 201. In the preferred embodiment, sub-pictures are generated for the entire received video sequence before any mosaic screens are generated. In other embodiments, the generation of mosaic screens begins as soon as a number of sub-pictures corresponding to the number of pictures in the screen is generated. In further embodiments, the generation of a mosaic screen is begun as soon as one sub-picture has been received.

Specifically, the generation of sub-pictures may be generated during recording, playback or during idle times of the apparatus. Thus, the apparatus may have functionality for generating the sub-pictures during recording or playback, but as this is computationally demanding, the apparatus may have functionality for accessing the recorded video signal and generating the sub-pictures when the apparatus is otherwise idle. This reduces the requirements for the computational resource, as the same resource can be used for compression during recording, de-compression during playback and sub-picture generation during idle times.

In the preferred embodiment, the mosaic screen controller 109 generates a sub-picture at regular intervals such that the temporal distance between sub-pictures is constant. It is within the contemplation of the invention, that sub-pictures may be generated at discrete times according to any suitable algorithm or scheme. Specifically, the mosaic screen controller may instigate the generation of a new sub-picture when the video signal comprises a scene change.

When sufficient sub-pictures for the generation of a mosaic screen have been generated, the process continues in step 205 by generating a video signal comprising sub-pictures. In the preferred embodiment, the mosaic screen generator 107 generates a video signal comprising a mosaic screen of sub-pictures.

Figure 3:
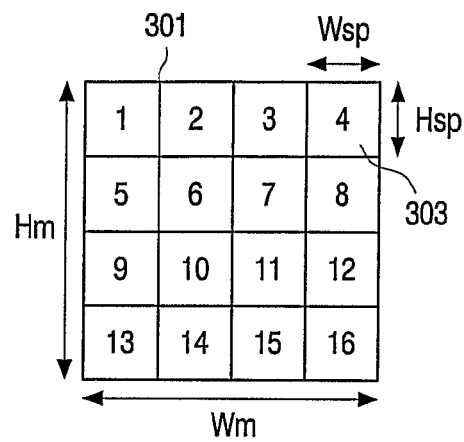
FIG. 3 illustrates an example of a mosaic screen for the preferred embodiment of the invention.

FIG. 3 illustrates an example of a mosaic screen 301. The mosaic screen 301 has a pixel height of Hm pixels and a width of Wm pixels. In a preferred embodiment Hm is 320 pixels and Wm is 384 pixels. In a preferred embodiment, the mosaic screen 301 comprises sixteen sub-pictures 303. Any number of sub-pictures that is an integer divisional by the macroblock size can be used to generate a mosaic-screen. Each sub-picture has a pixel height of Hsp pixels and a width of Wsp pixels. In the preferred embodiment, Hsp is 80 pixels and Wsp is 96 pixels. Thus, the mosaic screen is simply made up by positioning the pixels of a sub-picture adjacent to the pixels of the adjacent sub-picture in the mosaic screen. In the preferred embodiment, the mosaic screen and the sub-pictures are stored as data values in memory, and the generation of the mosaic screen is achieved by moving the data values for the respective sub-pictures into the appropriate memory locations of the mosaic screen.

When the video signal comprising the mosaic screen has been generated in step 205, the method continues in step 207 and 209 by compressing the video signal. In the preferred embodiment, the compression scheme used is MPEG-2 and thus the same compression scheme is used for compressing the mosaic screen as was used for the original video signal. The compression is performed in the video compressor 111 that receives the picture comprising the mosaic screen from the mosaic screen generator 107. In the preferred embodiment, the transfer of the mosaic screen is by a pointer to the location of the mosaic screen in the memory.

In step 207, at least a first frame of the video signal is divided into a plurality of uncompressed picture blocks such that each picture block comprises video data related to only one sub-picture. Thus, in the preferred embodiment, the picture is divided into a number of macro blocks of 16 by 16 pixels as appropriate for the MPEG-2 compression scheme. The division is further such that each macro block is entirely within one sub-picture and thus the border of the sub-pictures is aligned with the borders of the macro-blocks. Hence, each sub-picture of 96 by 80 pixels is divided into 30 macro blocks arranged with 6 horizontally by 5 vertically. As a consequence, any direct operation on a sub-picture will only affect the macro-blocks of that sub-picture and will not affect any other sub-picture. In the preferred embodiment, the borders of the sub-pictures coincide with the edges of the macro-blocks, but in other embodiments, the sub-pictures are comprised within the boundaries of the macro-blocks but without the edges aligning. In this case, the remaining pixels can comprise a border separating the individual sub-pictures in the mosaic screen.

In step 209, a compressed video signal is generated by using a video block compression scheme to generate compressed picture blocks from the uncompressed picture blocks. Thus, in the preferred embodiment, MPEG-2 is used as the block compression scheme, and the mosaic screen is compressed using the MPEG-2 compression algorithm based on the division into macro blocks as performed in step 207. Block compression using MPEG-2 is well known in the art and will for brevity not be described further here.

The compressed video signal is fed to a video manipulation processor 113 which is operable to perform various operations on the compressed mosaic screen including for example scrolling, shifting, sub-picture selection, sub-picture replacement etc. The video manipulation processor 113 is connected to the mosaic screen controller, which through a user interface is operable to control the video manipulation processor 113 from user input.

Following the compression step 209, the method in accordance with the preferred embodiment continues in step 211, wherein at least a first sub-picture of the compressed video signal is manipulated by manipulating the association of control data with compressed picture blocks related to the first sub-picture without modifying compressed video data of compressed picture blocks.

Following the compression, each of the uncompressed picture blocks has been compressed to a compressed picture block, and thus each compressed picture block retains the property of only comprising video data related to a single sub-picture. Hence, sub-pictures can be manipulated in the mosaic screen by manipulation of the control data of the compressed picture blocks (macro blocks) without any amendment to the compressed video data of the macro blocks.

The video signal comprises control data associated with the compressed picture blocks. This control data comprises various information data, typically including information related to the location of the compressed picture blocks within the mosaic screen. Hence, a sub-picture can be moved within the mosaic screen simply by changing the location information of the control data associated with the compressed picture blocks of that sub-picture. In the preferred embodiment of an MPEG-2 compression scheme, the control data specifically comprises slice numbers contained in slice headers and indicating a vertical position, as well as macro block control data contained in the macro block and indicating a horizontal position. Thus, the control data may be a control data part of the compressed picture blocks (i.e. a data block having control data rather than picture data). Alternatively, the compressed picture blocks can be considered to correspond to the picture data part of the MPEG-2 macro blocks only. Thus, the control data of MPEG-2 macro blocks may be considered as not belonging to the compressed picture blocks.

In accordance with one embodiment, the manipulation of a first sub-picture comprises replacing compressed picture blocks of the first sub-picture with picture blocks of a different picture without changing the control data. Consequently, the first sub-picture is replaced in the mosaic screen by the second sub-picture simply by replacing whole macro blocks or the picture data part of macro blocks without any de-compression or compression being required. In fact, simple parsing can be used to identify macro blocks of the first and the second blocks. The control data is not itself changed but the data content of blocks associated with the control data is changed from being data of the first sub-picture to being data of the second sub-picture. This is particularly useful for embodiments, wherein the video signal protocol is such that compressed picture blocks are ordered in the video signal according to their position within the picture, and where control data is followed by the compressed picture blocks to which it relates.

In a different embodiment of the invention, the step of manipulating the sub-picture comprises associating the control data of a second sub-picture with the compressed picture blocks of the first sub-picture. In this embodiment, a horizontal relocation of a sub-picture within a mosaic screen can be achieved by changing data in the control data such that the relation is changed from being to the macro-blocks of the first picture to being to macro-blocks of the second picture. This is particularly advantageous for embodiments wherein compressed picture blocks are not ordered in the video signal according to their position within the picture but the location is determined by location information in the associated control data.

In the preferred embodiment where MPEG-2 compression is used, the compressed video signal comprises a plurality of slices each slice comprising a slice header and a number of consecutive compressed picture blocks. This enables the manipulation of the sub-pictures to be performed on the slices and specifically by the control data comprised in the slice headers.

Various strategies for sub-picture encoding with slices can be used including each slice comprising a single compressed picture block, a number of compressed picture blocks corresponding to a width of a sub-picture or a number of compressed picture blocks corresponding to a width of the whole picture.

Figure 4:
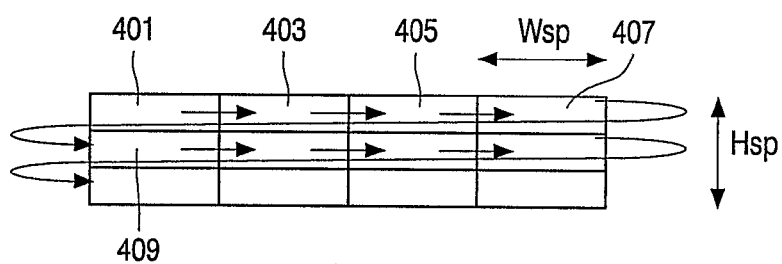
FIG. 4 illustrates a mosaic screen containing sub-pictures constructed with mini slices wherein the width of a slice is equal to the width of a sub-picture.
Figure 5:
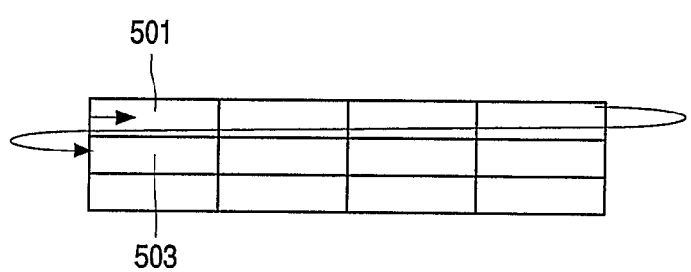
FIG. 5 illustrates a mosaic screen containing sub-pictures constructed with slices wherein the width of a slice is equal to the width of the whole picture.
Figure 6:
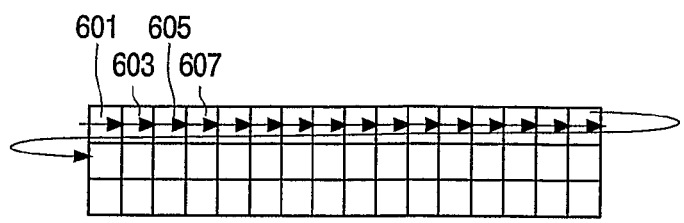
FIG. 6 illustrates a mosaic screen containing sub-pictures constructed with mini slices wherein the width of a slice is equal to the width of a compressed picture block.

FIGS. 4 to 6 shows mosaic screens containing sub-pictures constructed with slices of different sizes. The figures will in the following be described with specific reference to the MPEG-2 compression format, wherein the position data of compressed picture blocks is comprised in the slice header (vertical position) and the control data of the first macro block directly following the slice header (horizontal position). The compressed picture blocks will in the following description refer to the picture data content of macro blocks, and control data will refer to the control data of the slice header and/or the control data comprised in the macro blocks and specifically in the first macro block of each slice.

FIG. 4 illustrates a mosaic screen containing sub-pictures constructed with mini slices, wherein the width of a slice is equal to the width of a sub-picture, i.e. 96 pixels in the preferred embodiment. The height of the slice is 16 pixels and thus a sub-picture is made up of 5 slices. In this embodiment, the sub-pictures can be filtered from an existing mosaic screen, retrieved from a sub-picture data base or relocated to a different position simply by operating on the mini slices and the control data of the macro blocks without changing any compressed picture data. For example, by changing the association of control data of slice headers and the first macro block with compressed picture blocks (comprised by the picture data of the macro blocks), the position of the compressed picture blocks may be changed within the mosaic screen. The change in association can be by changing the slice header data, vertical shift and/or control data of the macro block's horizontal shift information. Alternatively or additionally, the change in association can be managed by manipulating the macro blocks within the signal such that the macro blocks following a slice header are changed.

In MPEG-2, a slice header comprising the vertical information, is followed by a macro block comprising horizontal information. The following macro blocks do not comprise absolute horizontal information and therefore the second and consequent macro blocks may be moved in the picture without the control data of slice headers and first macro-blocks being changed. Hence, the slice headers and first macro blocks can be seen as a template into which the various compressed picture blocks can be put. In FIG. 4-6, the arrows thus illustrate the position of the slice headers. As such, FIG. 4 may be seen as illustrating the template for the mosaic screen, which can then be filled with appropriate compressed picture blocks.

In different embodiments, the sub-pictures may be manipulated by for example only performing operations on slice headers, on macro blocks or on both slice headers and control data of the macro-blocks. Alternatively and additionally, the manipulation may be by manipulation of macro-blocks within the template formed by the slice headers and the horizontal information control data of the first macro-block of each slice.

FIG. 4 illustrates an example of a horizontal shift in a mosaic screen. In this embodiment, the position of the first sub-picture is manipulated by replacing the compressed picture blocks of a slice with compressed picture blocks of the consecutive slice without modifying the slice header or the control data of the macro blocks directly following the slice header. Thus, the picture data of the macro blocks of one slice is replaced by the picture data of the macro blocks of the consecutive slice. Hence, the compressed picture blocks in slice 401 are moved to slice 403, while the control data of the slice is maintained, i.e. the slice header and the control data of the first macro blocks of both slice 401 and 403 are unchanged. Likewise, the compressed picture blocks of slice 403 are moved to slice 405, the compressed picture blocks of slice 405 to slice 407 and so on. The compressed picture blocks of the slice 407 are moved to slice 409. New compressed picture blocks are added to slice 401. In one embodiment, the new compressed picture blocks simply correspond to a black image. In other embodiments, the new compressed picture blocks inserted in slice 401 may represent a new sub-picture. In yet other embodiments, the picture data of the slice 407 is not moved to slice 409, but is moved to slice 401 resulting in a horizontal rotation.

In the embodiment of the previous paragraph, the sub-picture on the right-hand side of the screen is moved to the left-hand side of the mosaic screen but lowered one slice level (or at the same slice level if compressed picture blocks of slice 407 are moved to slice 401 etc.). In a typically preferred embodiment, the sub-picture on the right hand side of the mosaic screen is moved to the position of the next lower sub-picture on the left-hand side of the mosaic screen. In this embodiment, slices from the sub-picture(s) on the right-hand side of the mosaic screen are moved to slices of the left-hand sub-pictures, which are as many slice levels lower as there are vertical slice levels in a sub-picture. Thus, in the example described wherein each sub-picture comprises five slices, the compressed picture blocks of slice 407 are moved to the slice five levels below slice 401.

FIG. 5 illustrates the embodiment of a slice having a width identical to the width of the picture. The scrolling operation is here achieved by the compressed picture blocks of slice 501 being moved to the slice 503 of the next line and so forth. In this example, the horizontal position of the macro blocks is unchanged and only the vertical position is changed. Hence, in this case the control data of the macro blocks are identical for the horizontal position data, and therefore the control data of the macro blocks may be moved together with the picture data of the macro blocks. Thus, the compressed picture blocks may in this example be identical to the macro blocks of the MPEG-2 compression scheme. In this case, the entire mosaic screen is thus scrolled down (or up) with very low complexity. This embodiment requires modification of slice headers only and does not require modification of control data of the macro blocks. However, manipulation of the mosaic screen is limited to the vertical direction as the slice headers of the preferred embodiment only comprise vertical position information.

FIG. 6 illustrates an embodiment wherein each slice comprises only a single compressed picture block. A shifting operation is achieved by moving the compressed picture blocks (i.e. the picture data of the macro blocks) from slice 601 to 603, from 603 to 605 and so on, while maintaining the control data of the slice header and macro blocks. A slice size of only a single compressed picture block provides increased flexibility as the manipulation can be done on a very small picture block but increases the complexity as more slice headers and control data must be manipulated. Similarly to the example of FIG. 4, the compressed picture blocks of the right-hand slices are preferably moved to the left-hand side slices five levels below.

A number of other operations can be performed on the sub-pictures based on manipulation of slice headers. In one embodiment, the slice header comprises a slice number and the manipulation of the at least first sub-picture comprises manipulating the position of the first sub-picture by modifying slice numbers for slices comprising compressed picture blocks of the first sub-picture. This specifically provides for the functionality of moving sub-pictures in a vertical direction.

In accordance with an embodiment of the invention, the control data comprises identification data, and the method further comprises the step of selecting the compressed data blocks of the first sub-picture by parsing the compressed video signal to detect identification data corresponding to the first sub-picture. Thus, the filtering of a sub-picture from an existing compressed mosaic screen can be achieved by a low complexity method. In this case, the video signal is simply parsed for identity information corresponding to the sub-picture to be selected. Specifically, the slice headers and/or control data of the macro blocks are parsed and the compressed picture blocks of the slices having the corresponding identity information are extracted.

Similarly, a new mosaic screen can be created by low complexity methods. For example in FIG. 3, replacing sub-picture 2 with sub-picture 6 can be achieved by simply replacing the slice numbers in the slice headers of the corresponding slices. This number is a byte aligned eight bit number that can easily be identified by parsing the video signal.

Further, the complex and resource demanding creation of sub-pictures needs only to be performed once and the generated sub-pictures can be re-used for various purposes by filtering as described above.

In accordance with one embodiment, the method includes replacing the compressed picture blocks with pre-defined compressed picture blocks without modifying the control information, whereby pre-determined pictures can be inserted in the compressed video signal. Hence, this allows easy insertion of synthetic macro blocks such as markers, icons, cursors etc. For example, a picture corresponding to a marker or text of different font can be created and compressed using MPEG-2 compression. The resulting compressed picture blocks can be stored in memory and later retrieved and inserted into a mosaic screen by directly replacing the appropriate compressed picture blocks of the video signal with those stored. Thereby pre-determined sub-pictures can easily be inserted in the mosaic screen.

Figure 7:
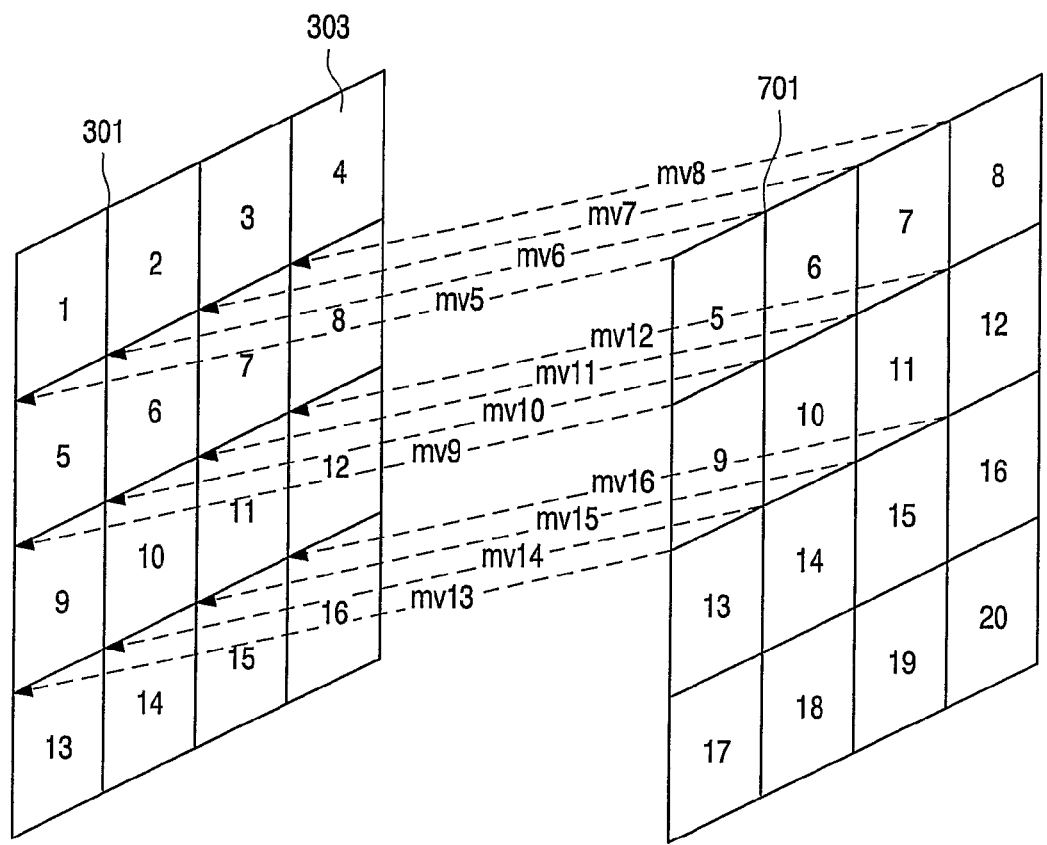
FIG. 7 shows a further advantageous coding according to an embodiment of the invention.

FIG. 7 shows an advantageous embodiment of the invention, wherein a further mosaic screen 701 is predictively coded with reference to mosaic screen 301, which is used as an anchor picture. The mosaic screen 301 may be encoded as an I picture or a P picture. For many applications, a given sub-picture in the further mosaic picture 701 is efficiently coded by setting all block motion vectors of the given sub-picture to a value which is equal to the relative sub-picture displacement between mosaic screen 701 and the reference screen 301. The relative sub-picture displacement can be determined under user control or in the mosaic generation process at transmitter side. In both cases, motion estimation and block matching is not required, because the sub-picture displacement is set outside the coder. Desired movement of one or more sub-pictures can be obtained from the user e.g. via a mouse or joystick. These desired movements can directly or indirectly be mapped to motion vectors for the corresponding blocks. As an example, FIG. 7 shows a scrolling operation. In screen 701 all sub-pictures 5 ... 16 are moved upwards over a distance corresponding with the height of the sub-pictures. New sub-pictures 17 ... 20 are added at the bottom of the screen 701. All motion vectors in the blocks of the sub-pictures are set equal to the displacement of the sub-pictures which is in this case the same for all sub-pictures. For example, all motion vectors of the blocks in sub-picture 5 are equal to the displacement mv5 of sub-picture 5 in mosaic screen 701 with reference to sub-picture 5 in mosaic screen 301. Depending on the operation performed, several sub-pictures can be encoded in such a way. Sub-pictures 17 ... 20 for which no corresponding sub-pictures are available in the mosaic screen 301 can be intra coded, e.g. in the form of intra-coded macroblocks. If there is some correlation between blocks in the sub-pictures 17 ... 20 and blocks in mosaic screen 301, the blocks in the sub-pictures 17 ... 20 can also be predictively coded with reference to blocks in the mosaic screen 301.

The above description has for brevity and clarity focused on an embodiment for mosaic screens but it will be apparent that the invention is equally applicable to other screens, images or pictures having sub-pictures.

The invention can be implemented in any suitable form including hardware, software, firmware or any combination of these. However, preferably, the invention is implemented as software program running on one or more data processors. The functionality, elements and components may be implemented in a single unit, in a plurality of units or as part of other functional units.

Although the present invention has been described in connection with the preferred embodiment, it is not intended to be limited to the specific form set forth herein. Rather, the scope of the present invention is limited only by the accompanying claims.

The invention claimed is:

1. A method of video processing, comprising:
generating a video signal comprising a plurality of frames;
dividing at least a first frame of the video signal into a plurality of uncompressed picture blocks such that each uncompressed picture block comprises control data related to only one sub-picture;
generating a compressed video signal by using a video block based compression scheme to generate a plurality of compressed picture blocks from the uncompressed picture blocks, wherein the control data is followed by an associated compressed picture block of the plurality of compressed picture blocks; and
manipulating at least a first sub-picture of the compressed video signal by manipulating the association of control data with a compressed picture block related to the first sub-picture without modifying the control data associated with the compressed picture block.

2. The method of claim 1, wherein manipulating at least the first sub-picture comprises replacing compressed picture blocks of the first sub-picture with compressed picture blocks of a different picture without changing the control data.

3. The method of claim 1, wherein manipulating at least the first sub-picture comprises associating the control data of a second sub-picture with the compressed picture blocks of the first sub-picture.

4. The method of claim 1, wherein the control data comprises information related to the position of an associated sub-picture.

5. The method of claim 1, wherein the control data comprises identification data and the method comprises selecting the compressed data blocks of the first sub-picture by parsing the compressed video signal to detect identification data corresponding to the first sub-picture.

6. The method of claim 1, wherein the compressed video signal comprises a plurality of slices each slice comprising a slice header and a number of consecutive compressed picture blocks.

7. The method of claim 6, wherein each slice comprises a single compressed picture block.

8. The method of claim 6, wherein each slice comprises a number of compressed picture blocks corresponding to a width of a sub-picture.

9. The method of claim 6, wherein the slice header comprises a slice number and the manipulation of at least the first sub-picture comprises manipulating the vertical position of the first sub-picture by modifying slice numbers for slices comprising compressed picture blocks of the first sub-picture.

10. The method of claim 1, wherein manipulating at least the first sub-picture comprises replacing compressed picture blocks with pre-defined compressed picture blocks without modifying the control data, pre-determined sub-pictures being inserted in the compressed video signal.

11. An apparatus for video processing, the apparatus comprising:
a processor; and
a memory storing instructions which when executed cause the processor to:
divide a video signal into a plurality of uncompressed picture blocks, that each uncompressed picture block of the plurality of uncompressed picture blocks comprising control data related to a sub-picture;
generate a compressed video signal by using a video block based compression scheme to generate a plurality of compressed picture blocks from the plurality of uncompressed picture blocks, wherein the control data is followed by an associated compressed picture block of the plurality of compressed picture blocks; and
manipulate at least a first sub-picture of the compressed video signal by manipulating an association between control data and a compressed picture block related to the first sub-picture without modifying the control data associated with the compressed picture block.

12. The apparatus of claim 11, wherein manipulating at least the first sub-picture comprises replacing compressed picture blocks of the first sub-picture with compressed picture blocks of a different picture without changing the control data.

13. The apparatus of claim 11, wherein manipulating at least the first sub-picture comprises associating the control data of a second sub-picture with the compressed picture blocks of the first sub-picture.

14. The apparatus of claim 11, wherein the control data comprises information related to the position of an associated sub-picture.

15. The apparatus of claim 11, wherein, when executed, the instructions cause the processor to select the compressed data blocks of the first sub-picture by parsing the compressed video signal to detect identification data corresponding to the first sub-picture, the control data comprising the identification data.

16. The apparatus of claim 11, wherein the compressed video signal comprises a plurality of slices each slice comprising a slice header and a number of consecutive compressed picture blocks.

17. The apparatus of claim 16, wherein each slice comprises a single compressed picture block.

18. The apparatus of claim 16, wherein each slice comprises a number of compressed picture blocks corresponding to a width of a sub-picture.

19. The apparatus of claim 16, wherein the slice header comprises a slice number and the manipulation of at least the first sub-picture comprises manipulating the vertical position of the first sub-picture by modifying slice numbers for slices comprising compressed picture blocks of the first sub-picture.

20. The apparatus of claim 11, wherein manipulating at least the first sub-picture comprises replacing compressed picture blocks with pre-defined compressed picture blocks without modifying the control data, pre-determined sub-pictures being inserted in the compressed video signal.

* * * * *